US010506097B2

(12) United States Patent
Papakipos et al.

(10) Patent No.: US 10,506,097 B2
(45) Date of Patent: *Dec. 10, 2019

(54) CALL-TERMINATION-TRIGGERED SOCIAL INTERFACE

(71) Applicant: Facebook, Inc., Menlo Park, CA (US)

(72) Inventors: Matthew Nicholas Papakipos, Portola Valley, CA (US); David Harry Garcia, Sunnyvale, CA (US); Paul Tarjan, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 17 days.

This patent is subject to a terminal disclaimer.

(21) Appl. No.: 15/636,997

(22) Filed: Jun. 29, 2017

(65) Prior Publication Data

US 2017/0302790 A1    Oct. 19, 2017

Related U.S. Application Data

(63) Continuation of application No. 15/175,338, filed on Jun. 7, 2016, now Pat. No. 9,729,706, which is a
(Continued)

(51) Int. Cl.
*G06F 15/16* (2006.01)
*H04M 3/42* (2006.01)
*G06F 16/29* (2019.01)
*G06F 16/44* (2019.01)
*G06Q 10/10* (2012.01)
(Continued)

(52) U.S. Cl.
CPC ........ *H04M 3/42042* (2013.01); *G06F 16/29* (2019.01); *G06F 16/444* (2019.01); *G06Q 10/10* (2013.01); *G06Q 50/01* (2013.01); *H04L 51/046* (2013.01); *H04L 51/32* (2013.01); *H04L 61/1594* (2013.01); *H04L 67/10* (2013.01); *H04M 3/42059* (2013.01);
(Continued)

(58) Field of Classification Search
CPC ........ G06Q 50/01; G06Q 10/10; H04L 29/06; H04L 29/08072; H04L 29/06027; H04L 12/581; H04L 61/1594; H04L 51/32; H04L 51/046
See application file for complete search history.

(56) References Cited

U.S. PATENT DOCUMENTS

| 8,644,847 B1 * | 2/2014 | Nelissen | H04W 4/023 455/415 |
| 2011/0294478 A1 * | 12/2011 | Trivi | H04M 3/436 455/415 |

(Continued)

*Primary Examiner* — Padma Mundur
(74) *Attorney, Agent, or Firm* — Baker Botts L.L.P.

(57) ABSTRACT

In one embodiment, a method includes receiving identifier-information from a device of a first user, wherein the identifier-information is associated with a source of an incoming communication; accessing a social graph including nodes and edges, where the nodes include a first node corresponding to the first user, and second nodes corresponding to respective second users; determining whether one or more reporting users, corresponding to respective second nodes within a specified degree of separation from the first node, have flagged the source of the incoming communication as a spam source; and sending, to the first user, a spam-notification object that includes information identifying one or more of the reporting users.

20 Claims, 6 Drawing Sheets

Related U.S. Application Data continuation of application No. 14/941,974, filed on Nov. 16, 2015, now Pat. No. 9,407,691, which is a continuation of application No. 13/316,209, filed on Dec. 9, 2011, now Pat. No. 9,218,627.

(51) Int. Cl.

| | |
|---|---|
| *G06Q 50/00* | (2012.01) |
| *H04L 12/58* | (2006.01) |
| *H04L 29/12* | (2006.01) |
| *H04L 29/08* | (2006.01) |
| *H04W 4/021* | (2018.01) |
| *H04M 3/436* | (2006.01) |
| *H04W 76/30* | (2018.01) |
| *H04W 88/02* | (2009.01) |

(52) U.S. Cl.
CPC ........... *H04M 3/436* (2013.01); *H04W 4/021* (2013.01); *H04W 76/30* (2018.02); *H04W 88/02* (2013.01)

(56) References Cited

U.S. PATENT DOCUMENTS

| | | | |
|---|---|---|---|
| 2012/0124479 A1* | 5/2012 | Morin | G06Q 10/10 715/741 |
| 2013/0067312 A1* | 3/2013 | Rose | G06Q 30/0269 715/234 |

* cited by examiner

CALL-TERMINATION-TRIGGERED SOCIAL INTERFACE

PRIORITY

This application is a continuation under 35 U.S.C. § 120 of U.S. patent application Ser. No. 15/175,338, filed 7 Jun. 2016; which is a continuation under 35 U.S.C. § 120 of U.S. patent application Ser. No. 14/941,974, filed 16 Nov. 2015, issued as U.S. Pat. No. 9,407,691 on 2 Aug. 2016; which is a continuation under 35 U.S.C. § 120 of U.S. patent application Ser. No. 13/316,209, filed 9 Dec. 2011, issued as U.S. Pat. No. 9,218,627 on 22 Dec. 2015, all of which are incorporated herein by reference.

TECHNICAL FIELD

The present disclosure relates generally to a social networking interface triggered by a call-termination event.

BACKGROUND

The advent of social networking and ubiquitous wireless data networks allows a user of the social network to remotely retrieve an enormous amount of profile data for his or her contacts, or friends, on the social network with little to no latency. Directory service-based caller ID systems may lack access to data that is available on the social networking system, and a user may manually access a dedicated social networking application after a call terminates if he or she wishes to perform on network actions relating to the entity or user associated with the social networking system.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF EXAMPLE EMBODIMENT(S)

Overview

Particular embodiments relate to social interface triggered by a call-termination event that pulls profile information from a social networking system and permits the user to quickly perform actions on the social networking system through user-selectable interface elements. In particular embodiments, the social interface may be delivered to the user as an HTML5 mobile application or web page. In particular embodiments, it may be a separate application.

Implementations of the present invention extend these concepts by allowing the social networking system may still pull public profile information of incoming callers for display to the user receiving the call. Further, when the incoming number is not associated with any particular user, but a hub page representing a business, the social network may also pull information from the hub page for display to the user. Further, the social networking system may send reviews of the calling entity from the friends of the user on the social networking system, and permit the user to confirm or dispute the review. Finally, where the social networking system has no information about the incoming call, it may request that the user categorize or describe the call for future reference by other members of the social networking system.

Figure 1:
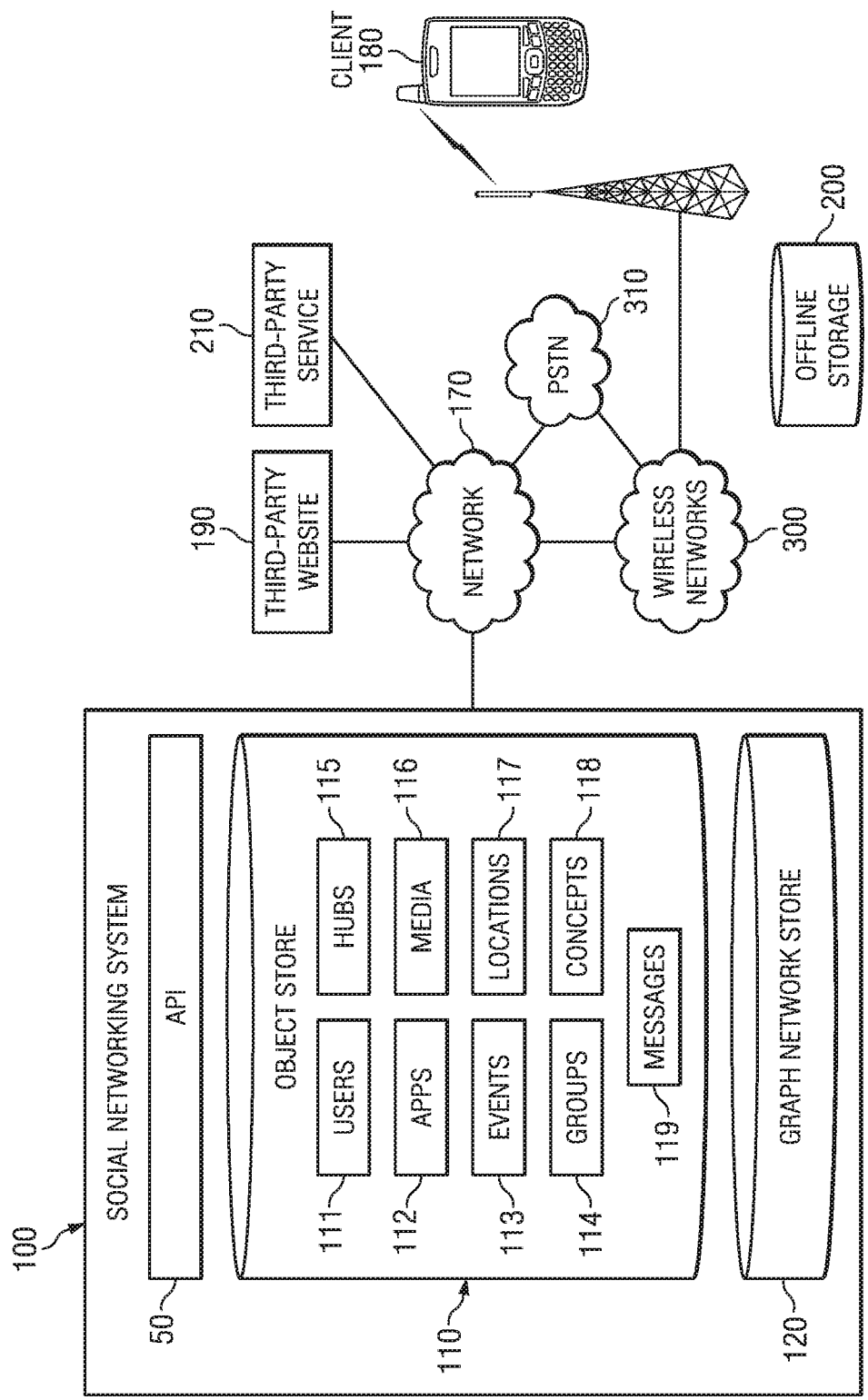
FIG. 1 illustrates an example social networking environment.

FIG. 1 is a high-level block diagram of an integrated messaging system according to one embodiment. FIG. 1 illustrates a social networking system 100, client device 180, wireless cellular network 300, third-party website 190, third-party communication service 210, and public-switched telephone network 310. It is understood that wireless cellular network 300 represents multiple wireless cellular networks provided by a plurality of carriers. FIG. 1 also includes offline storage 200 that is local to client device 180. Client device 180 is depicted as a mobile phone, but client device 180 may comprise any type of computing device, including mobile phone, laptop, netbook tablet, cable box, television, etc. Client device 180 is any computing device capable of receiving a call, whether it is a VoIP call through a packet-based data network 180, or a voice call from circuit-switched networks such as PSTN 310. Client device 180 has one or more memories capable of storing call, text, and other messaging data, depicted in FIG. 1 as offline storage 200.

Client device 180 interacts with external websites 190 and other service providers 210 through a web browser residing on the client device, or a dedicated application local to client device 180. For example, client device 180 may interact with third-party instant VoIP service 210, such as Google Voice™ or Skype™, by visiting and logging into their account via a web browser, or by installing and running a dedicated application. The same applies for video calls via third-party service providers 210 such as Apple FaceTime™ or Tango. This disclosure contemplates any type of third-party service provider 210 connected to network 170 or PSTN 300.

A user of the client device 180 interacts with the social networking system 100 via an application, such as a web browser or a native application, to perform operations such as browsing content, posting and sending messages, retrieving and sorting messages received from other users, and the like. Messages can be in any electronic message format such as electronic mail ("e-mail") messages, chat messages, comments left on a user's webpage, and short message service (SMS) text messages. Messages can contain plain text, or they can contain other content such as pictures, videos, and attachments. Each user has a mailbox that includes messages that are both sent and received by the user. Client device 180 may also use an application or browser to pull and view profile information for various user nodes and hubs in social networking system 100.

Client device 180, connected through wireless network 300, may also interact with other client devices through the circuit-switched, or non-data, portion of wireless network 300. For example, a user at client device 180 may transmit and receive a non-VoIP call to a cellular phone or landline in PSTN 310, transmit and receive a text or multi-media message through the SMS or MMS channels, or receive push notifications through the SMS control channel.

Additionally, the third party website 190 can also interact with the social networking system 100 via a system-provided application programming interface (API) 50. For example, the third party website can perform operations supported by the API, such as delivering messages to the social network system 100, retrieving messages stored by the social networking system 100, and obtaining social information about users of the social networking system 100.

The social networking system 100 comprises an object store 110, and a graph information store 120. The object store 110 stores information on objects, such as users, represented in or by the social networking environment 100. The graph information store 120 stores information on the relationships of the objects in the object store 110.

In particular embodiments, the social graph information includes a first set of user nodes that each correspond to a respective user, and a second set of concept nodes that each correspond to a respective concept. As used herein, a "user" may be an individual (human user), an entity (e.g., an enterprise, business, or third party application), or a group (e.g., of individuals or entities) that interacts or communicates with or over such a social network environment. As used herein, a "concept" may refer to virtually anything that a user may declare or otherwise demonstrate an interest in, a like towards, or a relationship with, such as, by way of example, a sport, a sports team, a genre of music, a musical composer, a hobby, a business (enterprise), an entity, a group, a third party application, a celebrity, a person who is not a registered user, etc. In particular embodiments, each node has, represents, or is represented by, a corresponding web page ("profile page") hosted or accessible in the social network environment.

By way of example, a user node may have a corresponding user profile page in which the corresponding user can add content, make declarations, and otherwise express him or herself, while a concept node may have a corresponding concept profile page ("hub") in which a plurality of users can add content, make declarations, and express themselves, particularly in relation to the concept. In particular embodiments, the social graph information further includes a plurality of edges that each define or represent a connection between a corresponding pair of nodes in the social graph. In particular embodiments, profile information for user nodes is stored in user store 111, while hub page information for concepts, such as businesses, is stored in hubs store 115. Nodes directly connected by a friend edge are considered one degree of separation away, and are listed as "friends" on the social network. Users of the social network may specify elements or portions of their profile which may be viewed only by friends, or friends of friends (second degree contacts). In particular embodiments, users may define privacy settings that only allow certain groups or individual members of the social network to view portions of their profile. For further detail on hubs, please see U.S. patent application Ser. No. 12/763,171 titled, "Integrated Social Network Environment," previously filed on Apr. 19, 2010 and fully incorporated by reference herein.

Figure 2:
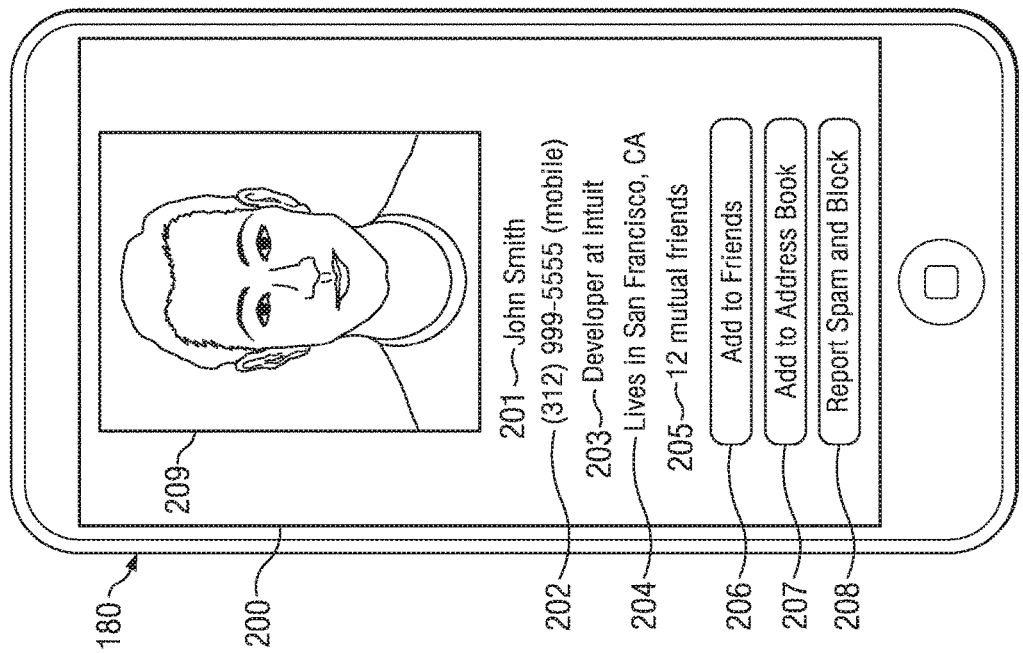
FIG. 2 illustrates an example interface implementing a social interface triggered by the termination of a call from a user of the social networking system.

FIG. 2 illustrates an example interface displayed to a user when the user's client (or mobile) device 180 terminates a call from a source associated with one of the user's contacts, or friends, on social networking system 100. Social interface 200 is displayed immediately after call termination. In particular embodiments, social interface 200 is displayed substantially simultaneously with the incoming communication. In particular embodiments, this incoming communication is a voice call, and the communication source is the incoming phone number. In particular embodiments, this communication is a VoIP call, and the communication source is an account (generally a username) for the VoIP service. In particular embodiments, the communication is a video chat, and the communication is an account (usually a username) for the video chat service. In other embodiments, the incoming communication is an e-mail, direct message from a third-party site, instant message, SMS/MMS message, and the like. Although this disclosure primarily pertains to real-time full-duplex communications, all other forms of communication are contemplated.

Social interface 200 includes a photo 209 of the incoming caller pulled from user store 111. In particular embodiments, photo 209 is the profile picture for the incoming caller. In particular embodiments, photo 209 is a random photo pulled from the incoming caller's photos. In particular embodiments, photo 209 is a photo that the incoming caller has been tagged in.

Social interface 200 also includes the incoming caller's name 201 and socially relevant data 202-205 that the user may quickly skim when deciding whether perform social actions 206-208. Socially relevant data 202-205 is anything that may be pertinent to the user that may be pulled from social networking system 100.

In particular embodiments, social interface 200 displays the number 202 of the incoming call, as well as the type of number (mobile, home, office etc.). In particular embodiments, social interface 200 displays publicly-posted work information 203. In particular embodiments, social interface 200 displays publicly-posted current city of residence 204. In particular embodiments, the social networking system queries a socially graph to determine the number of mutual first-degree connections between the user node associated with the client device and the user node associated with the incoming phone number. In such embodiments, social interface 200 displays the number of mutual friends to the user.

In particular embodiments, privacy information is respected by the application generating social interface 200. For example, if the caller has put the user on a limited profile that does not allow the user to see his current city, that setting will be respected and not displayed to the user. The only information that is displayed to the called user is information the calling user has made public Social interface 200 also includes social actions 206-208. In particular embodiments, social interface 200 includes an "add to friends" button 206, which, when selected by a user, transmits an instruction to social networking system 100 to transmit a friend request on the social network to the calling user from the called user. Thus the user may quickly add a calling party as a friend on the social network; traditionally, the user would be required to open a separate social networking application or navigate to the social networking web page from their mobile browser, search for the user's name (if known), and manually send a friend request to the calling user.

In particular embodiments, social interface 200 includes an "add to address book" button 207. In particular embodiments, the address book is locally maintained on client device 180, and the relevant information from social interface 200, such as profile picture 209 and social information 201-204, may be automatically added into client 180's address book stored in local memory. In particular embodiments, social networking system 100 may store an address book or phone book for the user associated with client device 180 on its own servers. In such embodiments, social networking system may add relevant information as well as a link to the calling party's social networking profile page in the called member's server-side address book. In particular embodiments, button 207 may import the calling party data to both a local and server-side address book. In particular embodiments, button 207 may cause client device 180 to export a vcard to Outlook or another contact management application. This disclosure contemplates any suitable manner of adding calling party information to an address book, as well as any suitable storage location for the called member's address book.

In particular embodiments, social interface 200 includes a "report spam and block" button 208, which, when actuated, transmits an instruction to social network 100 identifying the calling party as spam or telemarketing. In particular embodiments, social networking system 100 adds the called user's review to database of reviews for the calling number. In particular embodiments, button 208 causes client device 180 to apply a policy so as to no longer ring when receiving a call from the incoming telephone number 202. This disclosure contemplates any suitable action buttons 206-208, whether the actions are performed on social networking system 100, locally on client device 180, or a mixture of the two.

Figure 3:
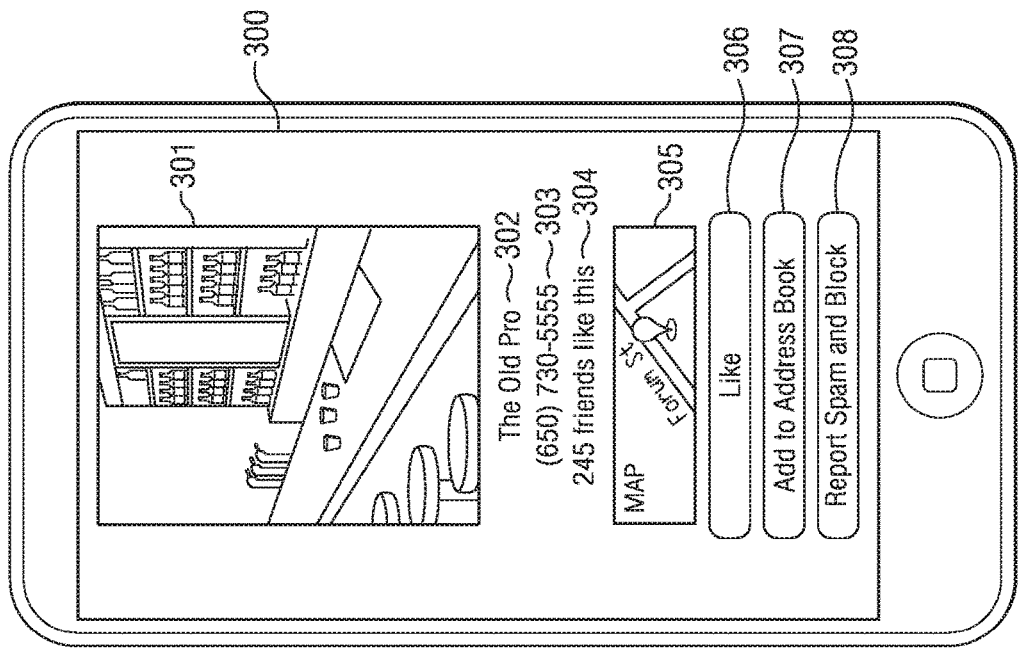
FIG. 3 illustrates an example interface implementing a social interface triggered by the termination of a call from a business in the social networking system.

FIG. 3 illustrates an example social interface 300 when client device 180 receives a call from a number that is associated with a concept node page, or "hub." As briefly described above, non-user entities may maintain nodes on social networking system 100, and each non-user entity may also have a profile page, also known as a "hub." In particular embodiments, all the information on hub pages is public, and is entered into the hub page by the administrator of the concept node associated with the hub.

Social interface 300 includes a picture 301 of the business or node owner. In particular embodiments, picture 301 is the profile picture for the hub. In particular embodiments, social interface 300 includes the name of the business 302 or hub owner (in this case, "The Old Pro") and its phone number 303. In particular embodiments, social interface 300 also includes socially relevant data, such as, for example, the number of friends of the user who have "liked" the hub 304, or the number of friends who have or are currently checked-in to the hub. Additionally, in particular embodiments, a map 305 to the business or location associated with the hub may be displayed. In particular embodiments, the address of the business may be displayed in lieu or in addition to a map. In particular embodiments, this map is selectable and can provide a link to navigation instructions or other actions by client device 180.

Social interface 300 may include action buttons 306-308 in a similar manner as described with reference to FIG. 2. In particular embodiments, social interface 300 may include a "like" button 306. In response to a user selecting "like" button 306, mobile device 180 transmits an instruction to social networking system 100, which then generates a "like" edge in the social graph between the node associated with mobile device 180 and the node representing the business on the social networking system. In particular embodiments, this is reflected on both the user's profile page as well as the business's hub page. In particular embodiments, social networking system 100 utilizes an open graph protocol that permits any business to define actions a user may take. In particular embodiments, social interface 300 may include buttons permitting any action that is permitted on the business's hub page.

In particular embodiments, social interface 300 includes an "add to address book" button 307. In particular embodiments, the address book is locally maintained on client device 180, and the relevant information from social interface 300, such as profile picture 301 and social information 302-304, may be automatically added into client 180's address book stored in local memory. In particular embodiments, social networking system 100 may store an address book or phone book for the user associated with client device 180 on its own servers. In such embodiments, social networking system may add relevant information as well as a link to the calling party's social networking profile page in the called member's server-side address book. In particular embodiments, button 307 may import the calling party data to both a local and server-side address book. In particular embodiments, button 307 may cause client device 180 to export a vcard to Outlook or another contact management application. This disclosure contemplates any suitable manner of adding calling party information to an address book, as well as any suitable storage location for the called member's address book.

In particular embodiments, social interface 300 includes a "report spam and block" button 308, which, when actuated, transmits an instruction to social network 100 identifying the calling party as spam or telemarketing. In particular embodiments, social networking system 100 adds the called user's review to database of reviews for the calling number. In particular embodiments, button 308 causes client device 180 to apply a policy so as to no longer ring when receiving a call from the incoming telephone number 302. This disclosure contemplates any suitable action buttons 306-308, whether the actions are performed on social networking system 100, locally on client device 180, or a mixture of the two.

Figure 4:
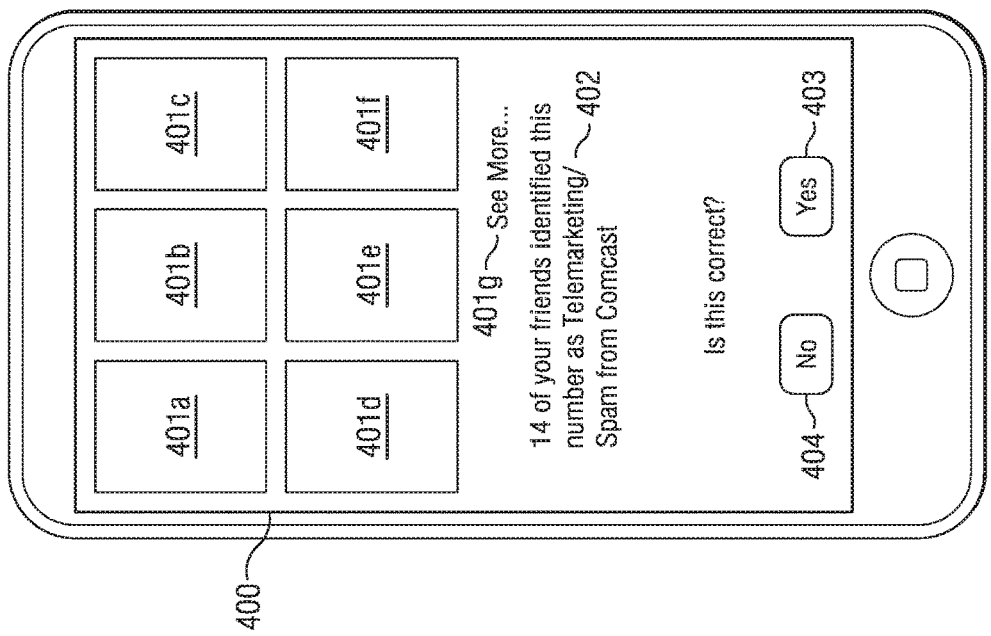
FIG. 4 illustrates an example interface implementing a social interface triggered by the termination of a call with social review information.

FIG. 4 illustrates an example social interface 400 displayed to a user after the termination of a call originating from a number that has been marked as spam or telemarketing by one or more friends of the called party on the social networking system. Social interface 400 includes a message 402 that states the number of the called user's friends on social networking system 100 that have marked the number as spam or telemarketing. In particular embodiments, message 402 also includes the entity from which the spam or telemarketing originated, in this example, "Comcast." In particular embodiments, social interface 400 includes the profile pictures 401a-401f of the called user's friends who have flagged the number as spam. In particular embodiments, profile pictures 401a-401f are arranged chronologically by the most recent flagging user. In particular embodiments, profile pictures 401a-401f are arranged in order of social coefficient, with the users that social networking system 100 has determined are closer to the called user displayed first. In particular embodiments, social interface 400 includes a "see more" element 401g that allows a user of mobile device 180 to see more profile photos for users who have flagged the call as spam or telemarketing.

Social interface 400 includes a confirm button 403 ("yes") or a dispute button 404 ("no"), that allows the user of mobile device 180 to confirm that the incoming call was telemarketing or spam, or, in particular embodiments, that the telemarketing/spam was attributed to the correct entity. Alternatively, the user of mobile device may select "No" button 404 to inform social networking system 100 that the call was not spam/telemarketing or that it was improperly attributed.

Figure 5:
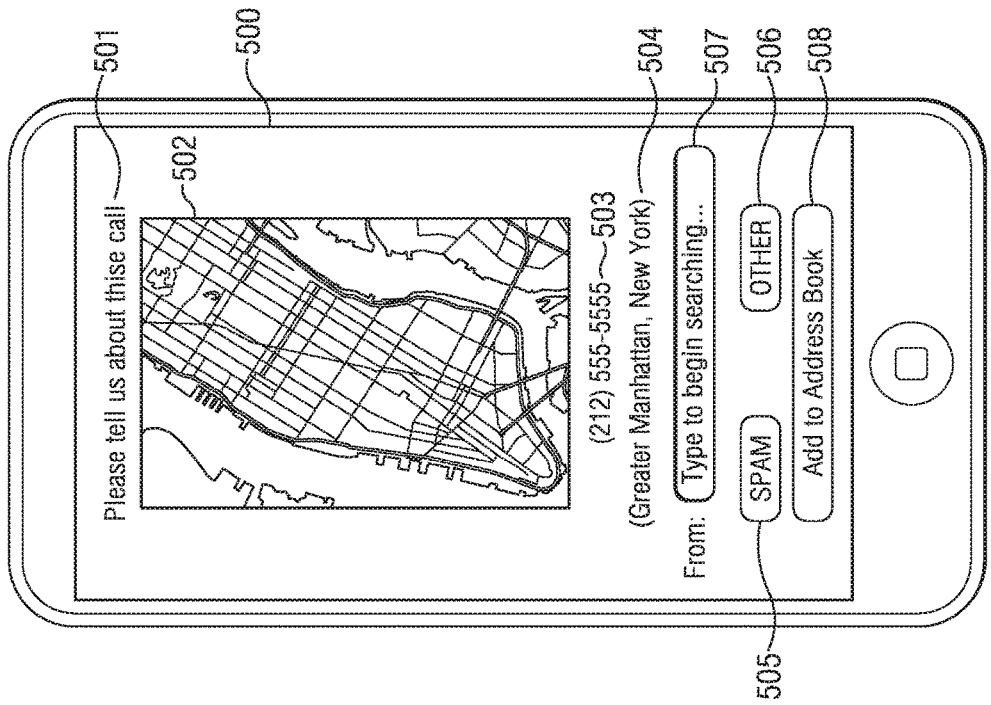
FIG. 5 is an example interface of a call-termination-triggered user interface requesting information about a call.

FIG. 5 illustrates an example social interface 500 requesting more information about the terminated call from the called party. In particular embodiments, social networking system 100 delivers social interface 500 to mobile device 180 after it cannot match the calling party's number to any node in the social graph. For example, if the calling party's number is not associated with any user, business, or if the social networking system has not previously received feedback on the number, the number is considered "new" to social networking system 100, and social networking system 180 displays social interface 500 to the user of mobile device 180. Alternatively, social interface 500 may be displayed on mobile device 180 when the user seeks to correct information contained in social interface 400. For example, if a user receives a call, and, upon termination of the call, receives social interface 400 stating that 14 of his or her friends have marked the call as "spam" from Comcast, the user may dispute the ratings of his friends by pressing "no" button, at which mobile device 180 subsequently displays social interface 500.

Social interface 500 includes a prompt 501 that requests that the user of mobile device 180 provide information regarding the previously terminated call. In particular embodiments, social networking system performs a reverse-lookup based on the area code of the calling number 503, and displays a map 502 of the area code in social interface 500. In particular embodiments, social interface 500 provides a description 504 of the geographic area associated with the area code of incoming number 503. This disclosure contemplates the inclusion of any other information that may be deduced from publicly available databases based on incoming number 503 in social interface 500.

Social interface 500 may, in particular embodiments, include "Spam" button 505 and "other" button 506 that, when actuated, transmit information back to social networking system 100 to flag the incoming number as a spam call or non-spam call, respectively. Upon receiving the flag, social networking system may, for a new number, create a node associated with the number and mark it in accordance with user instruction, or update an existing node in the social graph.

In particular embodiments, social interface 500 may include a search bar 507 that allows a user to type and search for concept nodes or businesses to attribute the incoming call to. For example, the user may seek to correct an attribution from "Comcast" to "AT&T" by typing "AT&T" in search bar 507, selecting AT&T from a drop-down menu, and selecting spam button 505. In particular embodiments, search bar 507 utilizes a typeahead feature that employs real-time search. For example, as the user begins typing, each character is transmitted to social networking system and searched against a database of concept nodes substantially in real time.

In particular embodiments, social interface 500 includes an "add to address book" button 508, as previously described with respect to FIGS. 2 and 3.

Figure 6:
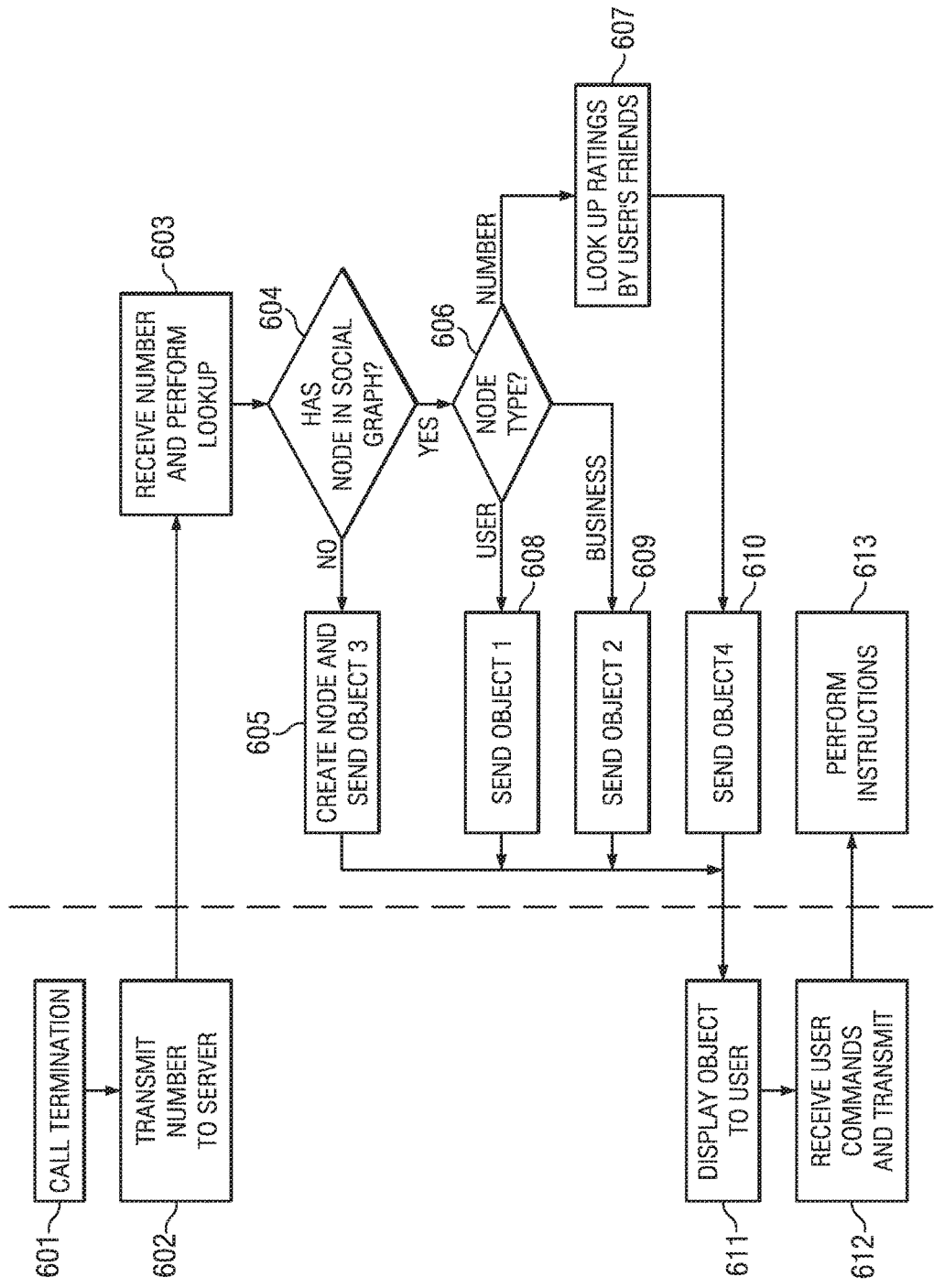
FIG. 6 is a flowchart illustrating an example method of transmitting social data to a client device after call termination.

FIG. 6 illustrates an example method of providing a call-termination-triggered social interface to a mobile device in accordance with one embodiment of the invention. At Step 601, an incoming call is terminated, either through user action or through calling party action. In particular embodiments, where mobile device 180 is capable of simultaneous voice and data connection, the triggering event may be the reception of an incoming call, so that social interface is already delivered to the user for nearly instantaneous display at the end of the call. In particular embodiments, social interface works in conjunction with a social caller ID application that pulls data from the social networking system in substantially real-time as incoming calls. For further description of a social caller ID application, please see commonly-owned U.S. patent application Ser. No. 13/214,940, entitled "Social Caller ID with Reverse Lookup", filed on 22 Aug. 2011 and fully incorporated by reference herein.

At Step 602, mobile device 180 transmits the number of the incoming call to the social networking system. In particular embodiments, mobile device 180 may transmit other information, such as a social networking system identifier for the user account associated with mobile device 180, to social networking system 100. In particular embodiments, the social networking system recognizes mobile device 180's MAC address, phone number, IMEI, IP address, or other identifier to associate mobile device 180 with a social networking user ID. This disclosure contemplates any suitable method of associating mobile device 180 with a social networking ID. Regardless of the method, the social networking system recognizes the incoming transmission as a transmission from a device associated with a particular user node in the social graph.

At Step 603, social networking system 100 receives the phone number or other identifier of the incoming call/communication, and performs a reverse lookup for any nodes in the social graph that are associated with the number. In particular embodiments, a node may be associated with a number with or without express permission by the node administrator. For example, if user A adds a number to his or her phone book for user B, the social networking system may, in particular embodiments, associate the phone number entered in user A's phone book with user B, even if user B has not added the number to his or her profile page. As another example, multiple users may submit that a particular 800 number is associated with the node for Continental Airlines. Social networking system 100 may, in particular embodiments, associate the number with the Continental Airlines node even if Continental does not add the number to its hub page. In particular embodiments, social networking system 100 may crawl third-party telephone directories such as gethuman.com to associate phone numbers with concept nodes in the social graph.

At Step 605, if social networking system 100 cannot find an associated node for the incoming number, it creates a node for the incoming number in the social graph. For example, even if the number is entirely new to social networking system 100, the system will still store a record of the call and phone number, in the hopes that eventually a node will either explicitly claim ownership of the number, or another user will associate the number with a particular user or concept node. After creating a temporary node for the incoming phone number, social networking system 100 transmits an object containing social interface 500 to mobile device 180. In particular embodiments, an application on client 180 maintains the resources necessary to render social interface 500, and social networking system 100 merely transmits a command to mobile device 180's application. In particular embodiments, social networking system transmits an HTML5 web page to mobile device 180, and mobile device 180 renders social interface 500 via its browser. In particular embodiments, client device transmits a JSON object containing JavaScript code and rendering assets for client device 180 to render and display to the user. This disclosure contemplates any suitable method of generating social interfaces for display on mobile device 180.

At Step 606, if social networking system 100 determines that a node exists in the social graph that is associated with the received incoming phone number, social networking system 100 transmits an object based on the type of node associated with the number. In Step 608, if the node associated with the number is a user node, social networking system 100 transmits an object containing social interface 200. Similarly, if the node associated with a phone number is a business or concept node, social networking system 100 transmits an object containing social interface 300.

Finally, if the number is associated only with a temporary node, such as for the "new" node generated in Step 605, social networking system 100 at Step 607 first looks for any ratings attached to the node, such as spam or telemarketing flags made by the first-degree connections of the user. In particular embodiments, social networking system searches for ratings from any user, not just the called user's first-degree connections. In particular embodiments, where there are conflicting ratings, social networking system 100 weights the called user's friend's ratings more heavily. In particular embodiments, social networking system 100 weights the called user's friends based on a social coefficient representing the degree of closeness between the called user and his or her friends. After pulling the required data, social networking system transmits an object containing social interface 400 to mobile device 180.

At Step 611, mobile device 180 displays one of social interfaces 200-500 to the user, and awaits input from the user. In particular embodiments, social interfaces 200-500 provide a selectable option to exit the social interfaces when the user cannot be bothered with filling out call information. In particular embodiments, clicking the exit option still permits the user to return to the social interfaces for later use, for example, from a call log application. In particular embodiments, mobile device 180 transmits call log data to social networking system 100, and the user may enter information about each call through social interfaces 200-500 on mobile device 180, or alternatively, at a later point through the social networking system's web site.

After receiving one or more inputs at Step 612, mobile device 180 translates user inputs into instructions and transmits them back to social networking system 100. At Step 613 social networking system 100 performs one or more actions as described above in accordance with the instructions. In particular embodiments, social networking system 100 may transmit additional social interfaces as follow up questions. For example, user receiving social interface 400 at Step 608 may respond that the ratings were not correct by actuating "no" button 404. In particular embodiments, social networking system 100 may, in response, transmit an object containing social interface 500 to mobile device 180. The user may then enter a concept node identifier through search bar 507, and social networking system 100 may associate the temporary node for the incoming number to the identified concept node in response. As previously discussed, this disclosure contemplates any combination of actions performed on social networking system 100, whether alone or in conjunction with local actions performed on mobile device 180.

Figure 7:
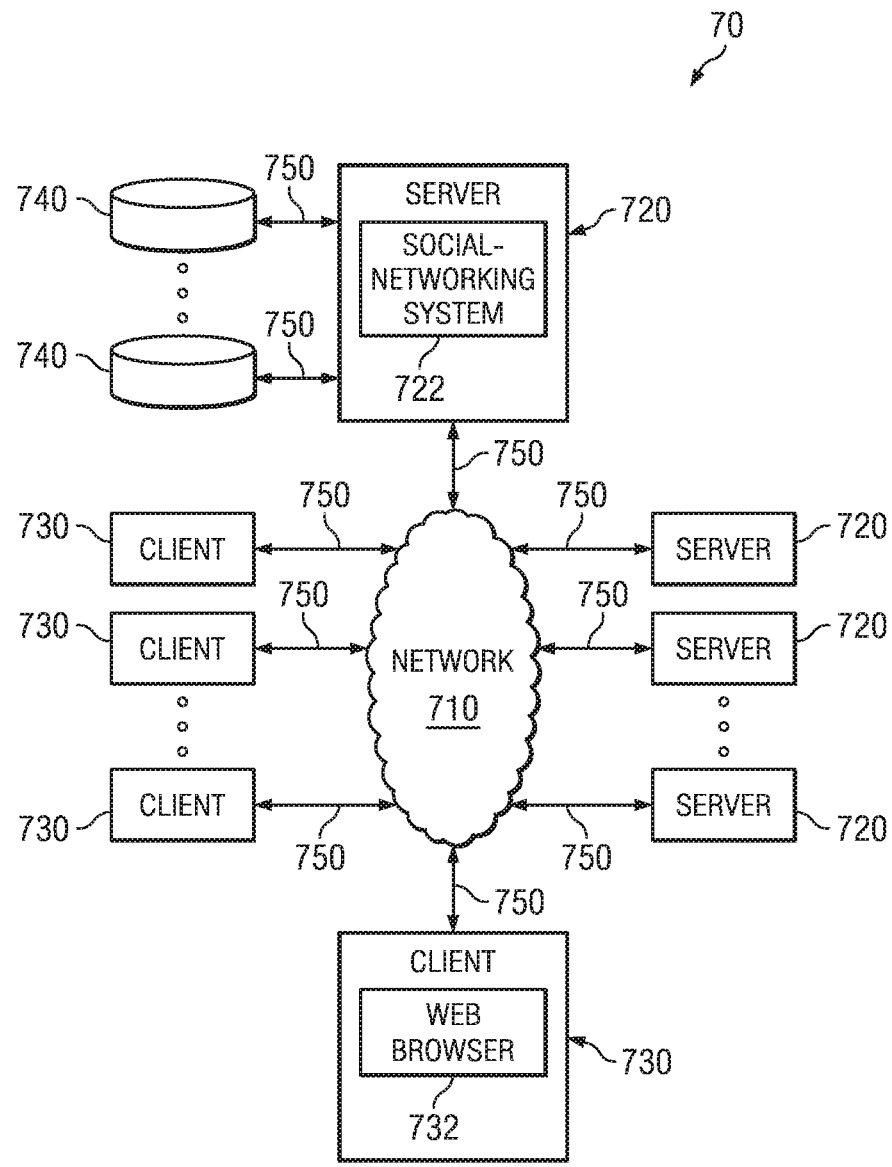
FIG. 7 illustrates an example network environment

While the foregoing embodiments may be implemented in a variety of network configurations, the following illustrates an example network environment for didactic, and not limiting, purposes. FIG. 7 illustrates an example network environment 700. Network environment 700 includes a network 710 coupling one or more servers 720 and one or more clients 730 to each other. Network environment 700 also includes one or more data storage 740 linked to one or more servers 720. Particular embodiments may be implemented in network environment 700. For example, a social networking system frontend may be written in software programs hosted by one or more servers 720. For example, event database 102 may be stored in one or more storage 740. In particular embodiments, network 710 is an intranet, an extranet, a virtual private network (VPN), a local area network (LAN), a wireless LAN (WLAN), a wide area network (WAN), a metropolitan area network (MAN), a portion of the Internet, or another network 710 or a combination of two or more such networks 710. The present disclosure contemplates any suitable network 710. One or more links 750 couple a server 720 or a client 730 to network 710. In particular embodiments, one or more links 750 each includes one or more wired, wireless, or optical links 750 or networks.

In particular embodiments, each server 720 may be a unitary server or may be a distributed server spanning multiple computers or multiple datacenters. Servers 720 may be of various types, such as, for example and without limitation, web server, news server, mail server, message server, advertising server, file server, application server, exchange server, database server, or proxy server. In particular embodiments, each server 720 may include hardware, software, or embedded logic components or a combination of two or more such components for carrying out the appropriate functionalities implemented or supported by server 720.

In particular embodiments, one or more data storages 740 may be communicatively linked to one or more servers 720 via one or more links 750. In particular embodiment, each data storage 740 may be a relational database. Particular embodiments may provide interfaces that enable servers 720 or clients 730 to manage, e.g., retrieve, modify, add, or delete, the information stored in data storage 740.

In particular embodiments, each client 730 may be an electronic device including hardware, software, or embedded logic components or a combination of two or more such components and capable of carrying out the appropriate functions implemented or supported by client 730. For example and without limitation, a client 730 may be a desktop computer system, a notebook computer system, a netbook computer system, a handheld electronic device, or a mobile telephone. The present disclosure contemplates any suitable clients 730. A client 730 may enable a network user at client 730 to access network 710. A client 730 may enable its user to communicate with other users at other clients 730.

A client 730 may have a web browser 732, and may have one or more add-ons, plug-ins, or other extensions. A user at client 730 may enter a Uniform Resource Locator (URL) or other address directing the web browser 732 to a server 720, and the web browser 732 may generate a Hyper Text Transfer Protocol (HTTP) request and communicate the HTTP request to server 720. Server 720 may accept the HTTP request and communicate to client 730 one or more Hyper Text Markup Language (HTML) files responsive to the HTTP request. Client 730 may render a web page based on the HTML files from server 720 for presentation to the user. The present disclosure contemplates any suitable web page files Herein, reference to a web page encompasses one or more corresponding web page files (which a browser may use to render the web page) and vice versa, where appropriate.

Figure 8:
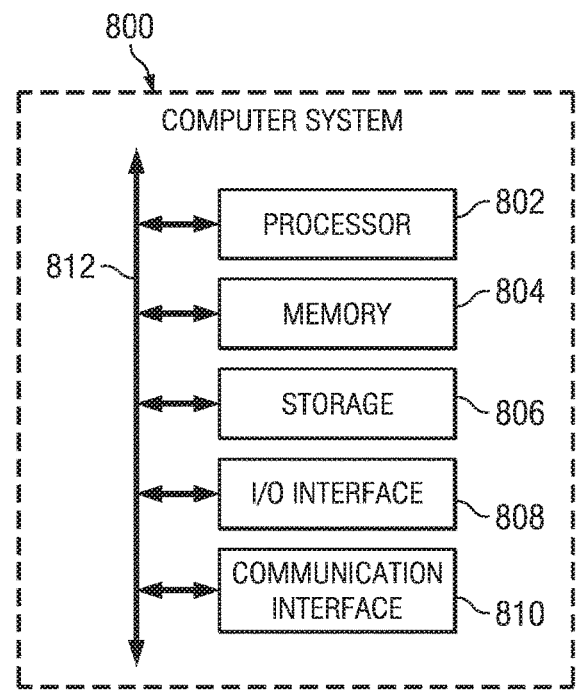
FIG. 8 illustrates an example computing system.

FIG. 8 illustrates an example computer system 800, which may be used with some embodiments of the present invention. This disclosure contemplates any suitable number of computer systems 800. This disclosure contemplates computer system 800 taking any suitable physical form. As example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 800 may include one or more computer systems 800; be unitary or distributed; span multiple locations; span multiple machines; or reside in a cloud, which may include one or more cloud components in one or more networks. Where appropriate, one or more computer systems 800 may perform without substantial spatial or temporal limitation one or more steps of one or more methods described or illustrated herein.

In particular embodiments, computer system 800 includes a processor 802, memory 804, storage 806, an input/output (I/O) interface 808, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement.

In particular embodiments, processor 802 includes hardware for executing instructions, such as those making up a computer program. As an example and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. Although this disclosure describes and illustrates a particular processor, this disclosure contemplates any suitable processor.

In particular embodiments, memory 804 includes main memory for storing instructions for processor 802 to execute or data for processor 802 to operate on. As an example and not by way of limitation, computer system 800 may load instructions from storage 806 or another source (such as, for example, another computer system 800) to memory 804. One or more memory buses (which may each include an address bus and a data bus) may couple processor 802 to memory 804. Bus 812 may include one or more memory buses, as described below. Although this disclosure describes and illustrates particular memory, this disclosure contemplates any suitable memory.

In particular embodiments, storage 806 includes mass storage for data or instructions. As an example and not by way of limitation, storage 806 may include an HDD, a flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. This disclosure contemplates mass storage 806 taking any suitable physical form. Where appropriate, storage 806 may include one or more storages 806. Although this disclosure describes and illustrates particular storage, this disclosure contemplates any suitable storage.

In particular embodiments, I/O interface 808 includes hardware, software, or both providing one or more interfaces for communication between computer system 800 and one or more I/O devices. One or more of these I/O devices may enable communication between a person and computer system 800. This disclosure contemplates any suitable I/O devices and any suitable I/O interfaces 808 for them. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 800 and one or more other computer systems 800 or one or more networks. This disclosure contemplates any suitable network and any suitable communication interface 810 for it. Although this disclosure describes and illustrates a particular communication interface, this disclosure contemplates any suitable communication interface.

In particular embodiments, bus 812 includes hardware, software, or both coupling components of computer system 800 to each other. Although this disclosure describes and illustrates a particular bus, this disclosure contemplates any suitable bus or interconnect.

The client-side functionality described above can be implemented as a series of instructions stored on a computer-readable storage medium that, when executed, cause a programmable processor to implement the operations described above.

Figure 9:
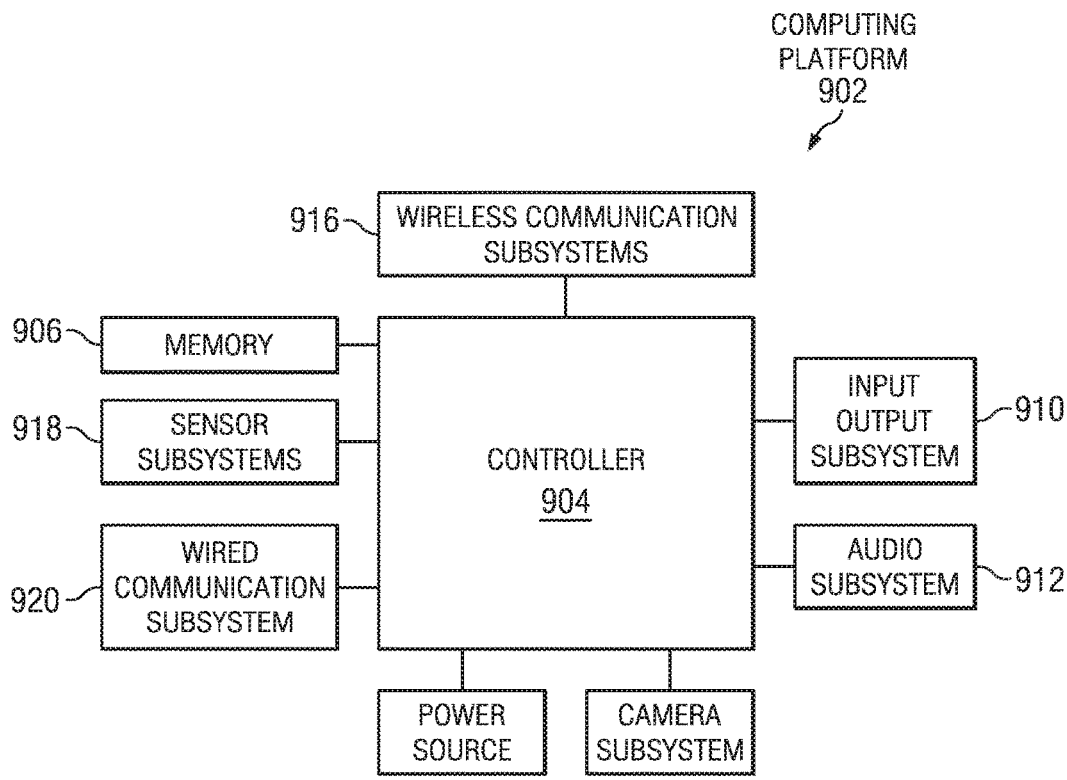
FIG. 9 illustrates an example mobile device.

While client device 180 may be implemented in a variety of different hardware and computing systems, FIG. 9 shows a schematic representation of the main components of an example computing platform 902, according to various particular embodiments. Multipoint sensing devices generally include a controller 904 which may comprise a microcontroller or one or more processors configured to execute instructions and to carry out operations associated with a computing platform. Controller 904 may optionally contain a cache memory unit for temporary local storage of instructions, data, or computer addresses. By way of example, using instructions retrieved from memory, controller 904 may control the reception and manipulation of input and output data between components of computing platform 902.

Controller 904 together with a suitable operating system may operate to execute instructions in the form of computer code and produce and use data. The operating system, other computer code (including control client 908 described below) and/or data may be physically stored within a memory block 906 that is operatively coupled to controller 904.

Memory block 906 encompasses one or more storage media and generally provides a place to store computer code (e.g., software and/or firmware) and data that are used by the computing platform 902. Memory block 906 may include one or more fixed storage devices in the form of, by way of example, solid-state hard disk drives (HDDs), among other suitable forms of memory coupled bi-directionally to controller 904. Information may also reside on a removable storage medium loaded into or installed in multipoint sensing devices when needed. By way of example, any of a number of suitable memory cards may be loaded into computing platform 902 on a temporary or permanent basis.

Controller 904 is also generally coupled to a variety of interfaces such as graphics control, video interface, input interface, output interface, and storage interface, and network interface, and these interfaces in turn are coupled to the appropriate devices. In certain embodiments, Controller 904 may connected to an input structure 914 and display 916 may be provided together, such an in the case of a touchscreen where a touch sensitive mechanism is provided in conjunction with the display 916.

Electric signals (e.g., analog) may be produced by microphone 910 and fed to earpiece 912. Controller 904 may receive instruction signals from input structure 914 and control the operation of display 916. Audio signals may be transmitted and received by means of an antenna 918 that may be connected through a radio interface 920 or audio input interface such as microphone 924 to codec 922 configured to process signals under control of controller 904. Additionally, multipoint sensing devices may be powered power source 932.

Mobile device may also include one or more user input devices 934 (other than input structure 914) that are operatively coupled to the controller 904. Generally, input devices 934 are configured to transfer data, commands and responses from the outside world into multipoint sensing devices.

Display device 916 is generally configured to display a graphical user interface (GUI) that provides an easy to use visual interface between a user of the computing platform 902 and the operating system or application(s) running on the mobile device.

Herein, reference to a computer-readable non-transitory storage medium may include a semiconductor-based or other integrated circuit (IC) (such as, for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, another suitable computer-readable non-transitory storage medium, or a suitable combination of these, where appropriate. A computer-readable non-transitory storage medium may be volatile, non-volatile, or a combination of volatile and non-volatile, where appropriate.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure. For example, although the foregoing embodiments have been described in the context of a social network system, it will apparent to one of ordinary skill in the art that the invention may be used with any electronic social network service and, even if it is not provided through a website. The invention is thus not limited to any particular type of communication system, network, protocol, format or application.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

While the foregoing processes and mechanisms can be implemented by a wide variety of physical systems and in a wide variety of network and computing environments, the server or computing systems described below provide example computing system architectures for didactic, rather than limiting, purposes.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising, by one or more computing devices:
    receiving identifier-information from a client device of a first user, wherein the identifier-information is associated with a source of an incoming communication made to the client device of the first user;
    accessing a social graph of an online social network, the social graph comprising a plurality of nodes and a plurality of edges connecting the nodes, each of the edges between two of the nodes representing a single degree of separation between them, the nodes comprising:
        a first node corresponding to the first user, and
        a plurality of second nodes that each correspond to a respective second user;
    determining whether one or more reporting users have flagged the source of the incoming communication as a spam source, wherein the one or more reporting users are one or more second users corresponding to one or more respective second nodes that are within a specified degree of separation from the first node; and
    sending, to the client device of the first user, a spam-notification object comprising a spam notification and profile pictures of the reporting users who have identified the spam notification as spam.

2. The method of claim 1, wherein the identifier-information is a phone number associated with the source of the incoming communication.

3. The method of claim 1, wherein the spam-notification object is displayed simultaneously with the incoming call.

4. The method of claim 1, further comprising receiving a social-networking-system identifier for a user account associated with the first user.

5. The method of claim 1, wherein the spam-notification object further comprises a description of the source of the incoming communication, the description including an identification of an entity associated with the source of the incoming communication.

6. The method of claim 1, wherein the spam-notification object sent to the client device further comprises information associated with the source, the information being deduced from publicly available databases.

7. The method of claim 1, wherein the spam-notification object comprises a representation of a total number of reporting users.

8. The method of claim 1, wherein the profile pictures are displayed in an order based on one or more times by which the reporting users identified the spam notification as spam.

9. The method of claim 1, wherein the profile pictures are displayed in an order based on social coefficients of the reporting users, wherein a social coefficient of a particular reporting user represents a degree of closeness between the first user and the particular reporting user.

10. The method of claim 1, wherein the spam-notification object further comprises a map of a geographic area determined to be associated with the source of the communication.

11. The method of claim 1, wherein the spam-notification object further comprises a description of a geographic area determined to be associated with the source of the communication.

12. The method of claim 1, wherein the spam-notification object further comprises one or more user-selectable elements, wherein the one or more user-selectable elements comprise one or more input fields for accepting a user review from the first user that confirms or disputes the identification of the spam notification as spam.

13. The method of claim 12, further comprising:
in response to the user review confirming the identification of the spam notification as spam, receiving a corresponding instruction from the client device; and
in response to the instruction, adding the user review to a database of reviews associated with the spam notification.

14. The method of claim 12, further comprising:
in response to the user review disputing the identification of the spam notification as spam, receiving a corresponding instruction from the client device; and
in response to the instruction, adding the user review to a database of reviews associated with the spam notification.

15. The method of claim 1, wherein the spam notification is a voice call or a video chat.

16. The method of claim 1, wherein the spam notification is an e-mail, a direct message from a third-party site, an instant message, or an SMS/MMS message.

17. The method of claim 1, wherein the profile pictures of the reporting users are arranged chronologically by the most recent reporting user who has identified the spam notification as spam.

18. One or more computer-readable non-transitory storage media embodying software that is operable when executed to:
receive identifier-information from a client device of a first user, wherein the identifier-information is associated with a source of an incoming communication made to the client device of the first user;
access a social graph of an online social network, the social graph comprising a plurality of nodes and a plurality of edges connecting the nodes, each of the edges between two of the nodes representing a single degree of separation between them, the nodes comprising:
a first node corresponding to the first user, and
a plurality of second nodes that each correspond to a respective second user;
determine whether one or more reporting users have flagged the source of the incoming communication as a spam source, wherein the one or more reporting users are one or more second users corresponding to one or more respective second nodes that are within a specified degree of separation from the first node; and
send, to the client device of the first user, a spam-notification object comprising a spam notification and profile pictures of the reporting users who have identified the spam notification as spam.

19. The media of claim 18, wherein the spam-notification object further comprises one or more user-selectable elements, wherein the one or more user-selectable elements comprise one or more input fields for accepting a user review from the first user that confirms or disputes the identification of the spam notification as spam.

20. A system comprising: one or more processors; and a memory coupled to the processors comprising instructions executable by the processors, the processors being operable when executing the instructions to:
receive identifier-information from a client device of a first user, wherein the identifier-information is associated with a source of an incoming communication made to the client device of the first user;
access a social graph of an online social network, the social graph comprising a plurality of nodes and a plurality of edges connecting the nodes, each of the edges between two of the nodes representing a single degree of separation between them, the nodes comprising:
a first node corresponding to the first user, and
a plurality of second nodes that each correspond to a respective second user;
determine whether one or more reporting users have flagged the source of the incoming communication as a spam source, wherein the one or more reporting users are one or more second users corresponding to one or more respective second nodes that are within a specified degree of separation from the first node; and
send, to the client device of the first user, a spam-notification object comprising a spam notification and profile pictures of the reporting users who have identified the spam notification as spam.

* * * * *